March 22, 1960  E. G. ANGER  2,929,980
TRANSISTORIZED ACCELERATION TIME RATE DELAY
CIRCUIT FOR DIRECT CURRENT
MOTOR SPEED CONTROLLER
Filed Oct. 1, 1957

INVENTOR.
ERNEST G. ANGER
BY

United States Patent Office 2,929,980
Patented Mar. 22, 1960

2,929,980

TRANSISTORIZED ACCELERATION TIME RATE DELAY CIRCUIT FOR DIRECT CURRENT MOTOR SPEED CONTROLLER

Ernest G. Anger, Wauwatosa, Wis., assignor to Square D Company, Detroit, Mich., a corporation of Michigan Application October 1, 1957, Serial No. 687,635

8 Claims. (Cl. 318—391)

This invention relates to motor control circuits and is more particularly concerned with a new and novel transistorized acceleration time rate delay circuit for direct current motor speed controllers.

Time rate acceleration controllers as presently used with motor speed controllers are usually provided with capacitive circuits which will delay the acceleration of a D.C. motor from 2 to 20 seconds. The function of these controllers is usually not to limit torque for motor considerations, since most motors require only about 1 second acceleration time, but for requirements dictated by the particular machine or process with which the motor is used. For practical considerations the capacitors used in these circuits preferably are of commercially available sizes and therefore if the time delay specified is to be accomplished very small currents must be utilized in the charging and discharging circuits.

It has been found that time delay circuits along with being sensitive to small currents must possess certain characteristics to be commercially acceptable. Among these characteristics are the time rate controller which must provide a constant acceleration delay rate from the beginning to end of the timing period. This means that the capacitors must be charged linearly. Further, it is important that the loading effect of the current drawn by the speed regulator does not influence the linearity of the time delay circuit. An additional consideration is that the time rate delay circuit must be insensitive to temperature changes and finally the device must not be subject to tube failure and must have a generous life expectancy.

The above features are all included into the time rate delay circuit according to the present invention which circuit includes transistor circuit arrangements which are connected and utilized in their circuits so the objects of the present invention may be achieved.

It is an object of the present invention to provide a transistorized time rate delay circuit for a D.C. motor speed controller.

Another object of the present invention is to provide a transistorized time delay circuit for a D.C. motor speed controller which insensitive to ambient temperature changes.

A further object of the present invention is to provide a constant current for charging a capacitor in a time delay circuit and to sharply terminate the charging at any preset potential as determined by a setting on the speed potentiometer and to provide an instantaneous discharge path for the capacitor when the potential setting of the potentiometer is decreased.

A further object of the present invention is to operate the transistors of a time rate delay circuit under constant emitter current conditions so the currents from the collector to the capacitor will be constant despite the diminishing charging voltage impressed on the collector. When this arrangement is employed the capacitor charging current will be held constant to zero charging voltage so the auxiliary charging "B" supply and clipping diodes as used in controllers heretofore known are eliminated.

A still further object of the present invention is to utilize a portion of the regulated voltage supply for the speed potentiometer to obtain an adjustable time rate signal current for charging a time rate capacitor and to transmit this current through the collector of a transistor which operates with constant emitter current so the collector current will be constant regardless of the voltage difference of the emitter which "floats" at the potential of the speed potentiometer slider.

A further object of the present invention is to compensate for the leakage current changes in the transistor of a time rate delay circuit in response to temperature changes.

Another object of the present invention is to utilize a transistor to compensate for changes in leakage current through transistors in response to temperature changes in a time rate delay circuit.

Further objects and features of the invention will be readily apparent to those skilled in the art from the specification and appended drawings illustrating a preferred embodiment, in which.

Figure 1:
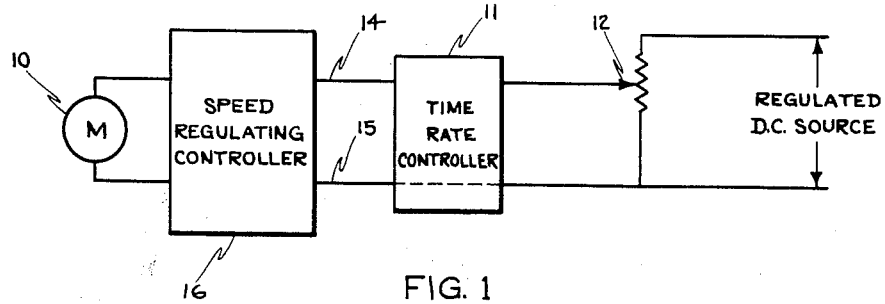
Fig. 1 shows schematically a D.C. motor speed controller as utilizing the time rate delay device according to the present invention.

In the drawings, and in Fig. 1 particularly, a control system for regulating the speed of motor 10 is shown. The present invention is directed to a time rate device 11 for controlling the motor acceleration and as shown, is connected between the output slider 12 of the speed setting potentiometer and the input leads 14 and 15 to the speed regulator 16. In normal continuous operation, that is, when the motor 10 is operating at a speed determined by the setting of the slider 12 on the potentiometer, the time rate delay device 11 furnishes a through connection with minimum possible voltage drop and operates as a closed switch contact, so that the regulated speed will properly respond to the motor setting. When the setting of the slider 12 on the potentiometer is suddenly moved to increase the motor speed, or the contacts of the starting switch are actuated to start the motor, the device 11 will provide the controller 16 with a controlled rate of change until the speed of the motor corresponds to the speed setting of the slider 12.

Typical time rate acceleration controllers provide acceleration delays which are adjustable from two to twenty seconds. It is to be appreciated that one of the requirements of a time rate device is that its timing must be linear and provide a constant rate of change in motor speed over the preselected time interval setting of the device. A device which will accomplish this result is shown in Fig. 2 of the drawings.

Figure 2:
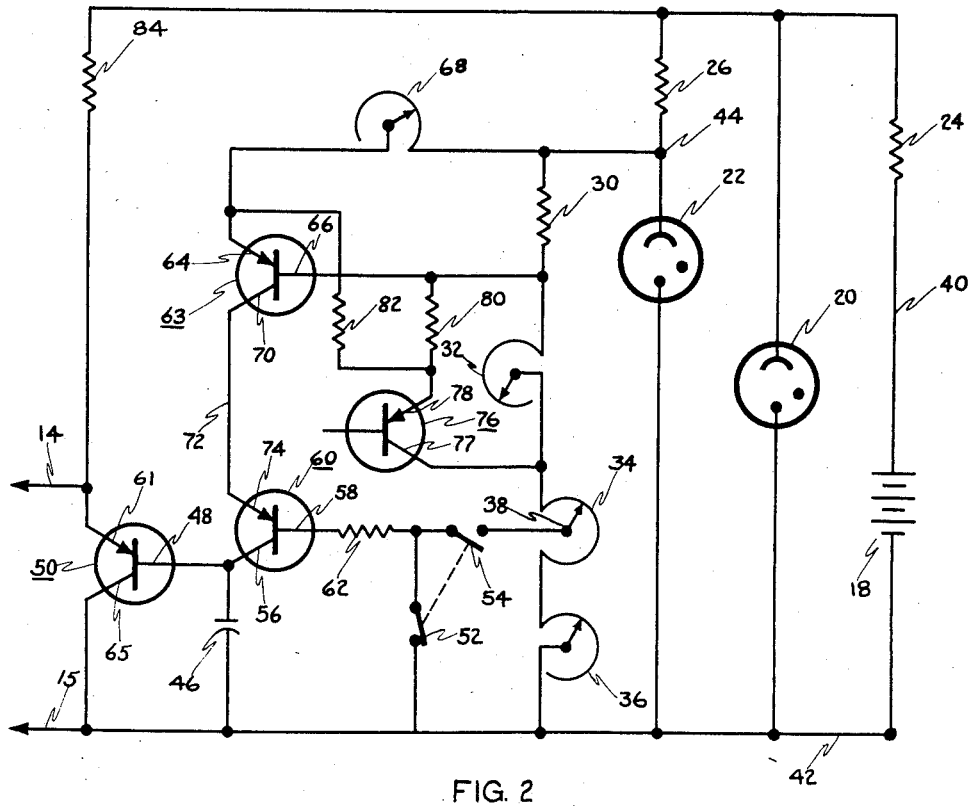
Fig. 2 shows a circuit diagram of a time rate delay device according to the present invention as used in the circuit shown in Fig. 1.

Before discussing the circuit in Fig. 2 it is believed a discussion of some of the operating characteristics of a PNP type transistor may be of value.

It has been found that transistors generally will have a current leakage between the emitter and collector even during periods when the transistor is nonconducting. This leakage current has been found to double for every 12° centigrade increase in temperature and ranges from 1 to 15 microamperes at normal temperatures (30° C.) depending on the particular transistor. It has also been found that the transistor is a constant current conducting device. That is, for constant emitter currents the collector will have a constant output currrent regardless of the collector to base voltage. When the voltage between the collector and base becomes a value slightly less than zero, the transistor will become sharply non-conductive and further reversal of collector to base voltage causes the transistor to conduct strongly as a diode in the reverse direction.

Considering the circuit shown in Fig. 2 of the drawings, the battery 18, the voltage regulating tubes 20 and 22, the fixed resistances 24, 26 and 30 and the variable potentiometer resistances 32, 34 and 36 comprise the regulated D.C. voltage source and the potentiometer 12 in Fig. 1 wherein the variable tap 38 on potentiometer 32 is analogous to the slider 12. It is clearly apparent the battery 18, which represents a D.C. source, may be replaced by an A.C. transformer and bridge type rectifier combination with suitable filter networks to provide a D.C. voltage between leads 40 and 42 which voltage is made constant by the glow tubes 20 and 22 which are regulating tubes and are connected in cascade as shown to provide a constant voltage between junction 44 and lead 42. The potentiometers 32 and 36 are included to respectively adjust the maximum and minimum speeds of motor 10.

The capacitor 46 is used in the circuit to delay the change in potential of the base 48 of transistor 50. This capacitor is of the well known oil-paper type which is of convenient size and will retain a charge without variable discharge as characteristic of other type capacitors such as electrolytic type capacitors. It is for this reason that the oil-paper type capacitor is preferred. However the present day commercially available capacitors of the oil-paper type are limited in capacitance, 15 mfd. being a commonly available capacitor. Thus if capacitor 46 has a capacitance of 15 mfd., and a twenty second time delay is required during a 40 volt change in voltage, then the charging current must equal 30 microamperes, for it is well known that the charging of a capacitor follows the equation $$i = C\frac{de}{dt}$$

However, as has been previously pointed out, the current leakage known as collector cut-off current through a normal transistor will range from 1 to 15 microamperes and will double for each increase of 12° C. Therefore the circuit shown also includes an arrangement for compensating for the increase in temperature which will be hereinafter described.

When the starter switch contacts 52 and 54 are in the position shown, any charge on the condenser 46 will be removed by the discharge path which is completed through the collector 56 to base 58 of transistor 60, the resistance 62, which limits the base current of transistor 60, and the closed switch 52. When the starting switch is actuated, the switch contacts 52 will open the discharge path for condenser 46 and complete the circuit between the base 58 of transistor 60 and the slider 38 of potentiometer 34.

The speed regulating controller 16 in Fig. 1 supplies a reference voltage proportional to the speed of motor 10 through lead 14 to the emitter 61 of transistor 50. This voltage is transmitted through the base 48 to the capacitor 46 and the collector 56. The reference voltage source provides a voltage signal from the slider 38 through closed switch contacts 54 and resistor 62 to the base 58. When the voltage between the base 58 and collector 56 becomes zero, timing is completed and the motor operates at a speed determined by the setting of slider 38.

The transistor 63 operates with a constant emitter current. It will be seen that the resistor 30 provides a constant bias between the emitter 64 and base 66 of the transistor 63 to cause the constant current flow. The value of this current flow will be determined by the setting of the potentiometer 68. The effect of this constant emitter current through transistor 63 will cause a constant current to flow in the collector of transistor 63 regardless of the voltage bias between the collector 70 and base 66. The constant current in collector 70 is passed through lead 72 to the emitter 74 of transistor 60. As heretofore stated, the leakage current present in each of the transistors 63 and 60 will vary from 1 to 15 microamperes and will flow between the base and collectors of these transistors even when the transistors are non-conducting. The leakage currents of transistors 60 and 63 are additive in the circuit shown and may equal 29 microamperes as current through collector 56. Not all of the 29 microamperes will appear as a charging current to capacitor 46 however because of the loss of one microampere in the emitter to collector of transistor 60, and the leakage loss of transistor 50 through the base 48 and collector 65. Thus the leakage current to capacitor will approximate 14 microamperes. This value is sufficiently below the 30 microamperes necessary to provide the twenty second time rate delay referred to previously.

When the slider 34 is moved upwardly to increase the speed of the motor 10, the base 58 of transistor 60 will become more positive than the collector 56 and current will flow from the base 58 to the collector 56 to charge the capacitor 46. The value of this current and therefore the time necessary to charge the capacitor 46 will depend on the current flow to the emitter 74 as adjusted by the potentiometer 68. After the capacitor 46 is charged to the new potential, determined by the setting of potentiometer 34, the collector and base of transistor 60 are at the same potential and the transistor 60 ceases to conduct collector current.

When the slider 38 of potentiometer is moved downwardly to reduce the speed of the motor 10, the collector 56 will be more positive than the base 58 and will conduct current without appreciable resistance to immediately reduce the charge on the capacitor 46 to the potential determined by slider 38.

As heretofore stated, the transistors shown have a continuous current leakage which varies with temperature, super-imposed on the desired operating current. The effects of temperature on the transistor leakage is compensated by the transistor 76 which has an open circuited base with the collector 77 connected to the speed potentiometer divider circuit and the emitter 78 connected through a current divider circuit consisting of resistances 80 and 82. The transistor 76 is subject to the same ambient temperatures as the transistors 63 and 60. Therefore the current leakage through the emitter 78 and collector 77 will vary similarly with temperature. It is however a larger magnitude than normal collector to base leakage due to the current amplification resulting from the open base connection. As the temperature increases, more current is subtracted through resistance 82 from emitter 64 in the timing control circuit to compensate for the increase in leakage current in transistors 60 and 63. The resistance 80 is included to provide a path for the excess current requirements of transistor 76. The resistance 82 is preferably selected to overshadow the low but variable input resistance of emitter 64 so as to divert accurately the proper current from the emitter 64 in response to temperature changes. Resistances 80 and 82 thus provide a current divider permitting a required amount of compensating current to be drawn from the emitter 64.

It is apparent that the output leads of the time rate circuit can be connected through other transistors which will act as "emitter follower" current amplifier stages to control the ouput of saturable reactor motor speed controllers such as is disclosed in co-pending application Serial No. 545,921 filed November 9, 1955 or control the operation of the motor speed control system shown in Patent 2,786,975 which has been assigned to the assignee of the present invention. In both of these systems the voltage signal which is proportional to the speed of the motor to be controlled is shown as being either a function of the back E.M.F. of the motor or the output of a tachometer generator which is driven by the motor. The connections of the time rate controller to the circuits shown in the patent and application mentioned supra will be readily apparent to anyone skilled in the art. Further it is apparent the transistor 50 which is supplied with constant emitter current through resistance 84 may be considered as part of the motor speed controller and not part of the delay circuit. The transistor 50 was included in the drawings to facilitate the explanation of the operation of the delay circuit and temperature compensating means.

In the description and drawings of the circuit, it will be noted that certain conventional elements such as current limiting resistances, bypass surge capacitors, etc., have been omitted to simplify the explanation of the circuit and its operation. These elements are well known to those skilled in the art and the value of such components and their dispositions will be obvious.

It is to be appreciated that the circuit described in this application will provide a time delay during acceleration only. Control of the time delay during deceleration can be readily accomplished according to the teachings set forth in an application Serial No. 687,553, Docket Number IC–171, concurrently filed herewith, wherein a circuit arrangement for accomplishing a time delay during acceleration and deceleration is shown.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a time delay circuit, the combination comprising; a reference voltage source providing an output voltage reference signal, a controlled source providing an output voltage signal proportional to the operation of the controlled source, means for controlling the operation of said controlled source in response to the reference signal, and means for delaying for a predetermined time interval the response of said controlling means in response to changes in the reference signal, said delaying means including a capacitor and a transistor arranged for controlling the charge and discharge of the capacitor in response to changes in the reference voltage signal.

2. In a time delay circuit, the combination comprising; a reference voltage source providing an output voltage reference signal, a controlled source providing an output voltage signal proportional to the operation of the controlled source, means for controlling the operation of said controlled source in response to the reference signal, and means for delaying for a predetermined time interval the response of said controlling means in response to changes in said signal, said delaying means including a capacitor and a transistor arranged for controlling the charge and discharge of the capacitor in response to changes in the reference voltage signal, and a means for rendering the operation of said transistor insensitive to changes in ambient temperature.

3. In a D.C. motor control circuit, the combination comprising; a reference voltage source providing an output voltage signal, a second source of voltage providing a signal proportional to the speed of said motor, means responsive to both signals for controlling the speed of said motor in response to differences between said signals, means including a storage capacitor and a transistor in circuit with the capacitor for delaying the responsiveness of the controlling means for predetermined time intervals, and circuit means including a second transistor for rendering the first mentioned transistor insensitive to changes in ambient temperature.

4. In a D.C. motor control circuit, the combination comprising; a reference voltage source providing an output voltage signal, a second source providing an output signal proportional to the speed of the motor, means responsive to the differences in the signals for controlling the speed of the motor in relation to the reference signal, capacitive means for delaying the responsiveness of said means to changes in the reference signal, conductive means sensitive to changes in ambient temperatures for providing a constant current for controlling the charging of the capacitor in response to changes in the reference signal voltage, and means sensitive to ambient temperature changes for maintaining a constant current through said conductive means in spite of variations in ambient temperature.

5. In a circuit of the character described, the combination comprising; a reference voltage source providing an output voltage signal, a second source providing a voltage signal proportional to the speed of an electric motor, means responsive to the signals of both sources for controlling the speed of the motor in accordance with the voltage of the reference signal, a means for delaying the responsiveness of the control means in response to changes in the reference signal, said means including; a transistor having an emitter, a base connected to the reference signal source and a collector connected to the speed signal source, a capacitor connected to the collector and speed signal source whereby said capacitor discharges through the collector and base when the potential of the speed signal exceeds the potential of the reference signal, and a means for supplying a constant current to the emitter of the transistor from said reference signal source whereby said capacitor is charged at a constant current from the reference signal source whenever the potential of the reference signal exceeds the potential of the speed signal.

6. The combination as set forth in claim 5 wherein the means for supplying a constant current to the transistor includes a second transistor which has its emitter connected in circuit with the reference voltage source and a means in the circuit for varying the current flow to the emitter of the second transistor.

7. The combination as set forth in claim 6 which includes a means for varying the current flow in the emitter of the second transistor in rseponse to changes in ambient temperature.

8. In a control circuit the combination comprising; a capacitor, means including a transistor having a collector connected to the capacitor and an emitter and base arranged for controlling the charging and discharging of the capacitor, means including a second transistor having a collector connected to the emitter of the first transistor and an emitter and base connected to a constant bias for supplying a constant current to the first transistor during the periods when the first transistor is controlling the charging of the capacitor, and a means including a third transistor subject to the same ambient temperature as the second transistor for compensating the constant current flow through the second transistor in response to variations in ambient temperatures of the transistors, said third transistor having an emitter connected through a resistance element to the emitter of the second transistor for diverting varying amounts of current flow through the second transistor to the first transistor in response to variations in ambient temperature.

References Cited in the file of this patent

UNITED STATES PATENTS 2,767,364     Guggi ------------------ Oct. 16, 1956
2,814,769     Williams --------------- Nov. 26, 1957